US006955828B2

(12) United States Patent
Smith

(10) Patent No.: US 6,955,828 B2
(45) Date of Patent: Oct. 18, 2005

(54) CHEESE RIPENING PROCESS

(75) Inventor: Mark Rodney Smith, Hayfield (GB)

(73) Assignee: Rhodia Texel Limited, Watford (GB)

( * ) Notice: Subject to any disclaimer, the term of this patent is extended or adjusted under 35 U.S.C. 154(b) by 0 days.

(21) Appl. No.: 10/168,581

(22) PCT Filed: Dec. 22, 2000

(86) PCT No.: PCT/GB00/04985

§ 371 (c)(1),
(2), (4) Date: Apr. 28, 2003

(87) PCT Pub. No.: WO01/47366

PCT Pub. Date: Jul. 5, 2001

(65) Prior Publication Data

US 2003/0165595 A1 Sep. 4, 2003

(30) Foreign Application Priority Data

Dec. 23, 1999 (GB) .............................. 9930546

(51) Int. Cl.$^7$ ................................................ A23C 9/12
(52) U.S. Cl. .............................. 426/42; 426/34; 426/36; 426/38; 426/43; 426/582
(58) Field of Search ............................ 426/34, 36, 38, 426/39, 40, 42, 43, 580, 582, 654

(56) References Cited

U.S. PATENT DOCUMENTS 6,649,200 B2 * 11/2003 Smith et al. ................. 426/42

2003/0180429 A1 * 9/2003 Smith et al. ................. 426/582

FOREIGN PATENT DOCUMENTS

| EP | 0 842 608 | 5/1998 | ......... A23C/19/032 |
| WO | WO 98/43488 | 10/1998 | ......... A23C/19/032 |
| WO | WO 00/00037 | 1/2000 | ......... A23C/19/032 |

OTHER PUBLICATIONS

Schormuller J., Mahler H.; Z. Lebensm–Untersuch. U. Forschung, No. 110, 1959, pp. 183–196, XP001001162.

El Abboudi M et al: Milchwissenschaft, DE, VV GmbH Volkswirtschaftlicher Verlag, Muchen, vol. 47, No. 10, 1992, pp. 625–628, XP000328598.

Farag A A et al: "Enhancementof Blue Cheese Flavor Using Sodium Dodecylsulphate and Lipase"—XP002166023.

G. Somkuti: Enxyme and Microbial Technology, US, Stoneham, MA. vol. 16, No. 7, Jul. 1994, pp. 573–576, XP002119225.

H. Choi: Journal of Dairy Science, vol. 79, 1996, pp. 956–963, XP002119224.

International Search Report.

* cited by examiner

*Primary Examiner*—Leslie Wong
(74) *Attorney, Agent, or Firm*—John A. Shedden

(57) ABSTRACT

Methods for accelerated cheese ripening using a biological agent, in particular microorganisms, wherein the biological agent has been treated with a surface active agent, (e.g. a detergent or surfactant) and wherein the biological agent is not an attenuated bacterial starter culture.

15 Claims, No Drawings

CHEESE RIPENING PROCESS

This application is an application under 35 U.S.C. Section 371 of International Application Number PCT/GB/04985 filed on Dec. 22, 2000.

The present invention relates to a process for the accelerated ripening of cheese.

Cheese ripening is the term used to describe the process whereby changes occur in the curd, resulting in the development of flavour, texture and aroma in the finished cheese. In commercial cheese production, ripening is commonly initiated by the addition of a bacterial starter culture and rennet to milk. The starter culture bacteria convert lactose into lactic acid, producing an acidic environment in which biochemical reactions occur that are critical for cheese ripening. (Scott, R., 'Cheesemaking practice'. Chapter 11, pages 145–146, 1986, Publ. Elsevier). Furthermore, enzymes released from the bacteria are also involved in the degradation of proteins into peptides and amino acids, and the breakdown of fatty acids into keto acids, ketones and esters by lipolysis. These breakdown products are important in the development of flavour, aroma and texture (Aston et al., Aust. Journal Dairy Technology, 38:55, 1983). In all, the ripening process can take up to a year or more.

Modern cheesemaking techniques employ a number of different methods in order to speed up the ripening process, so that the resulting cheese requires less storage time before maturation is complete and is available for sale more quickly.

One method for accelerating the rate of cheese maturation is to add purified bacterial proteolytic enzymes to the maturing cheese (Fox et al., Antonie van Leeuwenhock, 70. 271–297, 1996) but this involves expensive enzyme isolation. Moreover, the majority of the enzyme is commonly lost in the whey.

Acceleration of ripening can also be achieved by the addition of biological organisms other than starter culture bacteria, such as moulds, yeasts, and different species of bacteria which play a role in flavour development. These organisms are generally known as 'finishers' or 'affinage'. WO 98/43488 discloses one such method of accelerated ripening, in which finisher organisms are lysed to release enzymes and other extracts which are then added to a suitable food product, to achieve the accelerated ripening. However, one problem with such lysis techniques in cheese making is that enzymes released from the cell are commonly lost in the whey of the developing cheese.

There is still, therefore, a need for improved accelerated cheese ripening methods which produce an acceptable end product with respect to texture and flavour, and are safe for the consumer. In this respect, WO 98/43488 makes it clear that understanding of the maturation process is incomplete, and that introduction of a new factor into the ripening process 'always has consequences that are difficult to predict'.

The present invention sets out to develop an improved accelerated cheese ripening methodology.

In the first aspect, the present invention provides a method for accelerated cheese ripening using a biological agent. wherein the biological agent has been treated with a surface active agent, and wherein the biological agent is not an attenuated bacterial starter culture.

Treatment of the biological agent with a surface active agent allows enzymes within the biological agent to participate in the cheese maturation process. In contrast to the use of isolated enzymes or enzyme extracts released from cells by complete lysis, cells treated with a surface active agent remain in the cheese curd and are not lost in the whey. As such, enzymes contained within the cells are able to act to promote maturation of the curd. In this way, biological agents treated with an appropriate surface active agent promote efficient acceleration of maturation with a minimum inoculation of cells of the biological agent.

Moreover, the present invention allows incorporation of finisher organisms at an early stage in the cheese making process, which is beneficial for development and incorporation of flavour. Many 'finisher' organisms are aerobic and have previously only been added to the surface of the cheese after cheese production, as they are unable to grow in the body of the cheese. The present invention allows such organisms to be used during cheese production. which is highly advantageous.

The biological agent of the invention is suitably any agent whose cells contain extracts capable of enhancing cheese ripening and maturation. Preferably the biological agent is a micro-organism which is a GRAM+ or GRAM− bacteria. yeast or mould. The invention specifically relates to biological organisms which are termed 'finishers' or 'affinage' in the cheese making art [Steffen et al., 1993, in Fox, P. F. Cheese Chemistry. Physics and Microbiology, Chapter 3, p 83–110. Gripon. J. C. 1993. in Fox, P. F. Cheese Chemistry, Physics and Microbiology, Chapter 4, 111–136. Reps, A. 1993. in Fox, P. F. Cheese Chemistry, Physics and Microbiology, Chapter 5, 137–172]. Such agents do not play a role in acidification, unlike starter cultures, but play a role in the development of flavour within the cheese.

The specific nature of the biological agent to be used depends upon the nature of the cheese product, and the desired flavour. Preferred examples of finisher biological agents are:

GRAM+ bacteria:
Corynebacteriaceae family:
Corynebacterium genus, of the C. glutamicum species
Brevitbacterium genus, of the B. linens species
Arthrobacter genus, of the A. globiformis species
Propionobacterium genus
Micrococcaceae family:
Micrococcus genus
Staphylococcus genus, of species S. xylosus and S. Carnosus
GRAM− bacteria are:
Enterobacteriaceae family:
Hafnia genus, of H. alveï species
Enterococcus genus, of E. faecalis or E. faecium species
Yeasts:
Debaryomyces genus, of D. hansenii species
Saccharomyces genus, of S. cerevisiae species
Kluyveromyces genus, of K. lactis species
Geotrichum genus, of G. candidum species
Moulds:
Family of filamentous fungi:
Penicillium genus, of species P. candidum, P. chrysogenum, P. Roquefortii and P. nalgiovensis.

Other suitable 'finisher' biological agents will be well known to persons skilled in the art.

Biological agents of the invention, hereinafter referred to generally as 'micro-organisms', may be suitably prepared by growing cells of the micro-organism using standard techniques, followed by optional concentration of the cells, and then treatment with the surface active agent. Different strains of micro-organism may be used in conjunction with one another, and may be grown up together where appropriate.

Treatment of the micro-organism with a surface active agent preferably reduces the viability of the micro-organism. such that there are no detectably viable cells in the mature cheese final product. Elimination of viable cells is advantageous in ensuring that any given cheese product passes safety tests of any food regulatory body, which is particularly important when genetically modified organisms are being used in the cheese. Reduction to such low levels also has advantages in industrial practice, as it helps to prevent the isolation and identification of commercially valuable strains from the final cheese product. Advantageously, many of the preferred finisher cultures are aerobic, and would not grow in the cheese. Such finisher cultures are preferred.

The term 'surface active agents', as used herein, refers to any agent which is capable of acting on the membrane of a micro-organism to kill, incapacitate, or otherwise reduce the viability of the cell. The surface active agent is preferably a detergent or surfactant. We prefer that the agent is a detergent, such as an alkyl-carboxylate, a quaternary ammonium compound, a sulphonate, a betaine, a sulpho betaine, an alkyl glucoside, a bile salt, or an alkylethoxylate. More preferred are the specific detergents lauroyl-sarcosine salt, lauryl dimethylamine oxide, dodecyldimethylglycine, octyl-$\beta$-d-glucoside, cholic acid salts, deoxycholate salts and polysorbate 20, or mixtures of the above. We particularly prefer that the detergent is an alkylethoxylate, such as Triton® X-100 (t-octylphenoxypolyethoxyethanol), or a member of the sulphonate class, with the most preferred compound being sodium dodecyl sulphate (hereinafter referred to as 'SDS'). Where SDS is referred to herein, it will be understood that reference is also had to any other suitable surface active agent, unless otherwise specified.

The surface active agent is also preferably compatible with use in or with foodstuffs, or one that is easily removable from the treated cells before the addition of the cells to the milk or developing cheese. An acceptable surface active agent is one which may be safely consumed in the diet at levels found in the finished cheese. SDS is particularly preferable in this respect. It is already listed in the Food Chemicals Codex, as compatible for use in foodstuffs. is employed within the food industry as a surfactant and emulsifier, and is found as an ingredient in toothpastes. In general, such agents as bile salts are acceptable, although kosher considerations may need to be taken into account. It will be understood that the surface active agent should be present only in safe amounts in the finished cheese.

The surface acting agent may be used at any suitable concentration, such that the cell is permeabilised to allow accelerated cheese ripening. Preferably the treatment with the surface active agent is such that the desired enzyme activity is retained and cell viability is reduced, such that no detectably viable cells remain in the mature cheese final product, as discussed above.

We prefer that the concentration of surface active agent is sufficient to reduce the cell viability of the biological agent to levels of no more than $5 \times 10^4$ Colony forming units (CFU) per ml of cells of treated micro-organism concentrate, or less, preferably being so low as to effectively be 0. It will be appreciated that the concentration of surface active agent that is required will be dependent upon a number of factors, such as the nature of the surface active agent, the total number of cells, the cell density, the temperature and the time of contact with the cells.

In the specific case of SDS, we prefer that SDS is present at a final concentration of less than 1.5% w/v of the sample to be treated, preferably less than 1% w/v, more preferably less than 0.5% w/v. We also prefer that cells are treated at a temperature that allows enzyme activity to be retained, which is preferably between 2° C. and 15° C., more preferably less than 5° C. Under these circumstances we prefer that the cell culture is treated for at least one hour, although it will be appreciated that treatment for longer periods is also effective. However, it will be appreciated that incubation with surface active agent may be carried out at room temperature under certain circumstances. such as with rapid freezing techniques. In the case of Triton® X-100, we prefer that the detergent is used at a concentration of 1–5% w/w, preferably 1.5–3 w/w % for bacterial cells at a final concentration of $10^{11}$ CFU/ml. Concentrations of SDS or other surface active agents may be readily adjusted for micro-organisms which are fungal species or moulds.

The surface active agent may be added to the cells of the biological agent at any suitable point, but preferably after fermentation or growth is complete, with the cells at stationary phase. This allows an optimum interaction of the surface active agent with the membranes of the cells. However, it will be appreciated that the surface active agent may be added to the biological agent at any suitable point before stationary phase is reached, or at a later stage, such as after the cells have been concentrated to form a cell cream.

Without being constrained by theory, it is thought that disruption of the cell membrane by the surface active agent allows the enzymes within the cell to become accessible to substrate. This disruption also results in reduced cell viability. Therefore, the accessibility of the surface active agent to the membrane is likely to be the critical constraint in the efficiency of the attenuation process. For treatment of a cell cream, which contains cells at a higher density than a stationary phase culture, the concentration of surface active agent may have to be higher and will be related to cell concentration.

We prefer that the disruption of the cell membrane by a surface active agent allows the intracellular enzyme access to the substrates for the reaction, and allows release of the products of the reaction. We also prefer that the cell is not permeabilised to the extent that intracellular enzymes are released from within the cellular structure. In this way the intracellular enzyme is retained in the cheese curd during the treatment, with access to the relevant substrates, and is not lost in the whey.

Once the micro-organism has been treated with the surface active agent, the cells of the micro-organism may be added directly to the milk, to help in flavour development. However, we prefer that the cells are first centrifuged to form a cell cream. This cell cream may then be added directly to the milk. Alternatively, the cell cream may be further treated by freezing, or drying, for example, such that the culture is in a form appropriate for storage. Such treatment also helps to reduce the number of viable micro-organism cells, which is preferred.

The present invention generally requires that the treatment of the cells of the biological agent with the surface active agent does not significantly decrease the activity of the bacterial enzymes involved in cheese ripening, or any other enzymes involved in cheese flavour development. We prefer that the enzyme activity of the treated cells is at least 85% of the value of untreated cells, with at least 90% activity being particularly preferred. With respect, specifically, to cellular proteolytic enzymes, we prefer that at least 85% of the activity of these enzymes is maintained. In particular, we prefer that the level of proteases, peptidases, lipases and esterases remains generally unaffected by the treatment of the micro-organism with the surface active agent. Preferably the activity of enzymes involved in cheese flavour development is at least 90% of that in untreated cheese.

The present invention may be used in conjunction with other accelerated cheese ripening means.

In the art, one known alternative method for increasing the rate of ripening is to add a proportionally greater number of starter culture bacteria to the maturing cheese, in order to provide a larger pool of bacterial enzymes. However, if the number of bacteria added exceeds a certain threshold, the level of lactic acid that is produced by the bacterial starter culture imparts flavour and texture defects to the cheese. Thus, the maximum size of starter culture is effectively limited.

To increase the number of starter culture bacteria without increasing cheese acidity, modern cheesemaking methods have employed attenuated starter cultures, added at the same time as the primary culture. The primary culture is responsible for establishing the necessary acidity. However, in the attenuated starter culture, a majority of the cells is killed, or at least rendered incapable of growing in the cheese making process, such as by heat- or freeze-shocking, which prevents or suppresses acid production, but leaving proteolytic enzymes undamaged. Pre-treatment to kill a proportion of the cells, thereby preventing the metabolic processes that lead to acid production, is described by Frey el al. (Milchwissenschaft, 41 [11]. 1986). The treatment may also lyse some cells, resulting in losses of enzymes to the whey.

One problem with methods that are based upon temperature shock is that bacterial cells and the enzymes they contain have different sensitivity to heat treatment. Some starter culture cells are stable to temperature shock, while the enzymes important in cheese ripening are temperature sensitive. In this case it is difficult to sufficiently attenuate the cell culture whilst still retaining the desired enzyme activity. The end result is only a very moderate increase in flavour intensity. The use of heat shocked cells additionally presents other problems, such as cheese bitterness, off-flavours and acetaldehyde production. Moreover, the mass of cells required for this process may be economically prohibitive. Striking a satisfactory balance between sufficiently and economically attenuating the cell culture whilst retaining adequate enzyme activity has, thus, been described, but is effectively impossible to achieve in practice (Fox et al., supra).

Alternative pre-treatment methods using solvents, such as n-butanol, to accelerate ripening, have also proven commercially impractical (Exterkate F. A., J. Diary Res., 46. 473–484, 1979).

Thus, there is a need for a commercially practical method to attenuate a bacterial culture which both kills sufficient cells to limit the production of lactic acid but which also retains high levels of enzyme activity.

Treatment of starter culture cells with surface active agents to attenuate cells has already been shown to accelerate cheese ripening (WO 00/00037, incorporated herein by reference). However, this method may be combined with that of the present invention, to produce an accelerated ripening using attenuated starters and finishers.

As such, the present invention is not limited to use of finisher cells treated with a surface active agent alone, but extends to the use of such finisher cells in combination with attenuated or non-attenuated starter cells or preferably both to produce cheese. Suitably, cheese is then produced using a primary starter, attenuated adjunct starter and finisher cells treated with surface active agent. Preferably, starter cultures attenuated with surface active agents (i.e. the adjunct cultures) are used in conjunction with similarly treated finisher cultures.

Therefore, in a further aspect, the invention extends to a method of accelerated cheese ripening using an attenuated bacterial starter culture and a biological agent, wherein the attenuated starter culture and the biological agent are both obtained by pre-treatment with an acceptable surface active agent.

In this specific embodiment, considerations of cell viability and enzyme activity relating to the cells of the starter culture apply equally as they do to cells of the biological agent. That is, the enzyme activity of the cells is preferably maintained, and cell viability reduced such that no viable cells remain in the final cheese product.

The term 'starter culture' is well known in the art, and the invention extends equally to all known starter cultures. The term 'starter culture' specifically relates to bacterial cultures such as Bifidobacteria. Brevibacteria, Lactobacilli, Lactococci, Leuconostocs, Micrococci and Pediococci. We prefer that the culture is a member of the lactic acid bacteria. We particularly prefer that the bacteria that are used in the starter culture are *Lactococcus* species. It will be appreciated that the term 'starter culture' may encompass a culture containing a single strain of bacterium, or more than one bacterial strain. The term 'starter culture' may also include genetically modified organisms (GMO's).

The attenuated starter cultures are selected for their enzyme activity so that, while they will generally be selected within the criteria laid down above, it is preferred that they do not generate lactic acid as this is the function of the primary starter culture. In fact, the primary starter culture (or primary culture) will not generally start to produce lactic acid until after its addition. Accordingly, as this tends to rely on gene expression, the attenuated culture cannot play a large part in acidogenesis. Instead, the attenuated culture essentially serves as a source of ripening enzymes, but saves on the cost of isolating the individual enzymes and loses no activity through thermolability. It is particularly surprising that surface active agents, such as dodecyl sulphate, have no significant effect on enzyme activity, as they are known to be extremely denaturing (Scopes, R. K., Protein Purification, Principles and Practice, 1982, Springer advanced texts in Chemistry, publ. Springer-Verlag).

As used herein, the term "attenuated" relates to a bacterial culture so treated as to render the majority of the cells therein unviable. In the context of the invention, it is preferred that no cells be detectably viable in the mature cheese and, more preferably, that no cells should be detectably viable in the attenuated starter culture (or attenuated culture). The cells of the attenuated culture are preferably rendered unviable, or dead, without disruption. An homogenised preparation loses enzymes in the whey, as described above. However, a level of disruption is acceptable, provided that it is not too great.

When using a non-attenuated starter culture, variable growth of the starter culture cells is often observed. This frequently leads to variable enzyme activity levels and a degree of inconsistency in the degree of ripening, which is undesirable in a commercial operation. There is no problem with variable growth rates when treated starter cultures are used, as a defined quantity of the treated cells may be added having a predetermined enzyme activity. This reduces the variation in enzyme levels, and results in a more consistent cheese end product.

The present invention also extends to cover use of biological agents treated with surface active agents in combination with starter cultures that have a high level of intracellular, aminopeptidase activity. Such starters allow the additional use of an exogenous protease to help in the acceleration of cheese ripening, but without any undesirable flavour impairment.

Therefore, the present invention also relates to a method for accelerated cheese ripening using a biological agent in combination with a starter culture, wherein the biological agent has been treated with a surface active agent, wherein the biological agent is not an attenuated bacterial starter culture, and wherein the starter culture has a significant amount of aminopeptidase activity. In this way, exogenous proteases may be used in combination with the starter culture without cheese flavour impairment. The use of starter cultures with high aminopeptidase is described in WO00/13519. incorporated herein by reference.

The term 'significant', in relation to activity of the aminopeptidase enzyme, indicates that the enzyme must be capable of catalysing the breakdown of the exogenous protease. Accordingly, a high activity is preferred, specific for each aminopeptidase enzyme tested. The term 'high activity', with respect to PepN, preferably refers to levels of PepN activity greater than 3 units/g dry weight of starter culture strain. The definition of one unit of aminopeptidase activity is the amount of enzyme required to liberate p-nitroaniline at a rate of 1 $\mu$mole per minute from a 0.7 mM solution of L-leucine p-nitroanilide (Sigma) at pH 7 and 30° C., the reaction being carried out in 100 mM phosphate buffer. We prefer that PepN activity is greater than 5 U/g dry weight of starter culture strain with levels of 6 U/g dry weight of starter culture strain particularly preferred.

In addition to, or separate from, high levels of PepN activity, we prefer that levels of PepXP activity are greater than 20 U/g dry weight of starter culture strain, more preferably greater than 24 U/g dry weight of starter culture strain, with activity greater than 35 U/g dry weight of starter culture strain most preferred. Starter culture bacteria which have high levels of PepXP activity in conjunction with high PepN activity allows the production of cheese in the process of the present invention without associated bitterness.

More generally, in all embodiments of the invention, the accelerated ripening may be affected by addition of the treated biological agent at any appropriate stage of the cheese manufacturing process. Preferably, the treated agent is added to the milk before coagulation at the reneting stage or when acidification occurs. For bacterial cultures grown to a final cell concentration of $10^9$ colony forming units per ml or yeasts grown to $10^7$ colony forming units per ml, we prefer that the quantity of treated extract which is added is 1% of the total volume of the milk. However, this value may be varied by the person skilled in the art to ensure that cheese maturation occurs at the desired rate.

In general, methods well known in the art may generally be employed, together with the method of the invention, to make cheese.

The present invention will now be illustrated by way of the following example, which is illustrative of the present invention but not limiting upon it.

EXAMPLE 1

Materials and Methods

Strains Tested: SR3 (*Bevibacterium linens*), KL71 (*Kluyveromyces lactis*). MCV (*Staphylococcus xylosus*), MGE (*Arthrobacter nicotianae*), and Geo25 (*Geotrichum candidum*).

Growth and harvesting of cells was caried out using procedures routine in the art, and for example as explained in the ATCC strain catalogue, and articles such as: Bridson and Brecker, Design and formulation of microbiological culture media. Methods in Microbiology, Vol 3A, Norris and Ribbons, ed. New York Academic Pres, 1970; and Moreau et al, Microbiologie-Aliments-nutrition Vol 16, 1998 p251–258. Harvesting may be carried out by centrifugation or ultra filtration, by way of example.

SDS Treatment: Cell concentrates were treated with 0 or 1% SDS for 1 hour at 4° C.

The mixtures were then frozen (−40° C.) overnight.

Curd Slurry Test: Treated and untreated cell concentrates were added at the equivalent of $10^6$ cells per gram of slurried cheddar cheese curd (60% w/w moisture) and incubated under vacuum for 6 days at 30° C.

Sensory Analysis: Each slurry was evaluated by a trained sensory panel (n=9) using a triangle test. This is a powerful sensory technique to establish difference and similarities between test and control samples.

Results

Results are expressed as number of panellists finding the SDS treated cells to give more flavour than the corresponding control.

| STRAIN | NUMBER OF PANELLISTS IDENTIFYING FLAVOUR IMPROVEMENT |
|---|---|
| SR3 | 8/10 |
| KL71 | 6/10 |
| MCV | 9/10 |
| MGE | 7/10 |
| Geo25 | 5/10 |

Conclusion

Treatment of *Bevibacterium linens, Kluyveromyces lactis, Staphylococcus xylosus, Arthrobacter nicotianae*, and *Geotrichum candidum* with SDS can be used to accelerate cheese ripening.

What is claimed is:

1. A method for accelerating cheese ripening using a microorganism wherein the microorganism has been treated with a surface active agent, and wherein the microorganism is not an attenuated starter culture and does not generate lactic acid.

2. A method according to claim 1 wherein the microorganism is a finisher organism.

3. A method according to claim 1, wherein the microorganism does not play a role in acidification in cheese.

4. A method according to claim 1 wherein the microorganism is a GRAM+ or GRAM− bacteria, yeast or mould.

5. A method according to claim 1, wherein the surface active agent is a detergent or surfactant.

6. A method according to claim 5, wherein the surface active agent is a detergent, such as an alkyl-carboxylate, a quatenary ammonium compound, a sulphonate, a betaine, a sulpho betaine, an alkyl glucoside, a bile salt, or an alkylethoxylate.

7. A method according to claim 5, wherein the surface active agent is lauroyl-sarcosine salt, lauryl dimethylamine oxide, dodecyldimethylglycine, octyl-β-d-glucoside, cholic acid salts, deoxycholate salts, polysorbate 20, or a mixture of any of the forgoing.

8. A method according to claim 1, wherein the surface active agent is sodium dodecyl sulphate.

9. A method according to claim 8, wherein sodium dodecyl sulphate is present at a final concentration of less than 1.5% w/v of the sample of biological agent to be treated.

10. A method according to claim 1, additionally employing an adjunct bacterial starter culture strain.

11. A method according to claim 10, wherein the adjunct bacterial starter culture is attenuated, and wherein the attenuated adjunct starter culture and the microorganism are both obtained by pre-treatment with a surface active agent.

12. A method according to claim 10, wherein the adjunct starter culture has a effective amount of aminopeptidase activity.

13. A method according to claim 1, wherein cells treated with a surface active agent are further treated to reduce the number of viable cells.

14. A method according to claim 1, wherein at least 85% of the activity of proteolytic enzymes in the microorganism or attenuated starter culture is maintained.

15. A method according to claim 1, wherein at least 90% of the activity of enzymes involved in cheese flavour development is maintained.

* * * * *